Sept. 8, 1936.  E. C. HESS ET AL  2,053,557
HYDRAULIC BRAKING SYSTEM FOR MOTOR VEHICLES
Filed Aug. 20, 1934  3 Sheets-Sheet 1
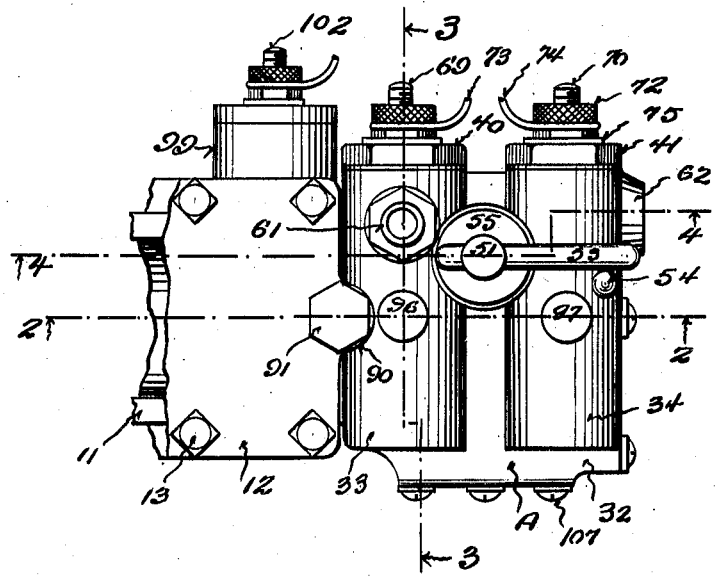
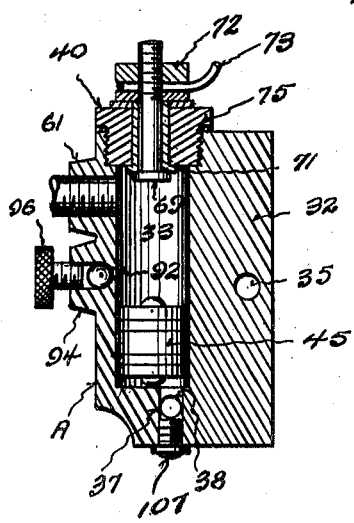
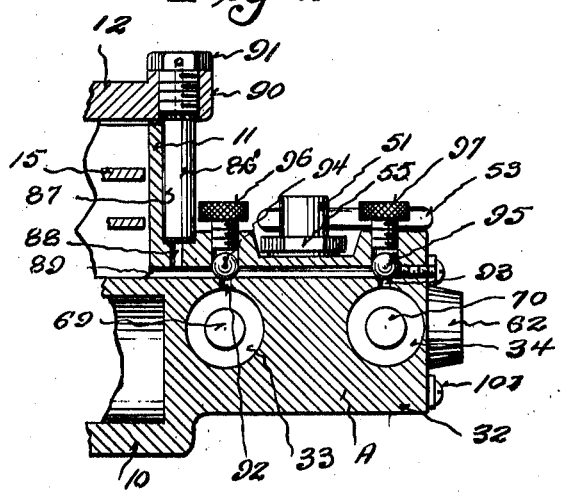
Inventors
Edward C. Hess
Emil Hess
Attorneys Sept. 8, 1936.        E. C. HESS ET AL        2,053,557
HYDRAULIC BRAKING SYSTEM FOR MOTOR VEHICLES
Filed Aug. 20, 1934        3 Sheets-Sheet 3

Inventors
Edward C. Hess
Emil Hess
By
Attorneys

Patented Sept. 8, 1936

2,053,557

UNITED STATES PATENT OFFICE 2,053,557

HYDRAULIC BRAKING SYSTEM FOR MOTOR VEHICLES

Edward C. Hess and Emil Hess, Berlin, Wis., assignors of one-third to M. J. Paul, Berlin, Wis.

Application August 20, 1934, Serial No. 740,688

6 Claims. (Cl. 303—84)

This invention appertains to motor vehicles, and more particularly to hydraulic braking systems therefor.

Hydraulic brakes are considered by many manufacturers to be the best equipment for motor vehicles. However, this type of brake has certain inherent characteristics which render the brakes objectionable. Thus, should a leak occur between the master cylinder and any one of the four wheel brakes, substantially the entire system is drained of its oil or other operating fluid. Not only does this result in an undue waste of fluid, but the entire braking system is rendered inoperative. This usually occurs without the knowledge of the vehicle operator. Hence, many bad accidents occur from this cause.

It is, therefore, the prime object of our invention to provide a hydraulic braking system, so constructed that should a leak occur either in the line leading to the two front brakes or the two rear brakes, or in the wheel brakes themselves, such front or rear brakes only will be rendered inoperative (with a minimum loss of fluid) leaving two operative brakes on the front or rear wheels, as the case may be, for perfect control of the vehicle.

Another salient object of my invention is the provision of means for automatically signalling the operator of the vehicle and indicating whether the front or rear brakes are inoperative, should a leak occur, thereby goving the operator notice that repairs to the brakes should be made.

We are familiar with the fact that it has been proposed to utilize floating valves in the line (see the patent to Edward C. Hess, No. 2,008,393, issued July 16, 1935) for cutting off loss of fluid to a leaky wheel brake. However, such devices are difficult and expensive to install and somewhat difficult to manipulate after a leak occurs.

Therefore, a further salient object of our invention is to provide an especially simple, compact, and durable structure which can be connected to or from a direct part of the master cylinder for efficiently cutting off the front or rear brakes, should a leak occur in either of the front or rear brakes, and for signalling to the operator of such leak, together with novel means for controlling the flow of fluid to the opposite sides of the floating piston valves from the master cylinder.

A further object of our invention is the provision of a safety device for hydraulic brakes embodying a pair of parallel cylinders cast en block for direct ionnection with the master cylinder for receiving the floating piston valves, one cylinder and piston valve being utilized for the front brakes, and the other cylinder and piston valve for the rear brakes, with a single control valve for directing the flow of fluid to one side of the floating piston valves during normal operation of the brake and for controlling the flow of fluid to the other side of the piston valves to facilitate the recharging of the system after the occurrence of a leak and the repair of such leak.

A further object of our invention is the provision of novel means for constructing the single valve, whereby the bleeding of the cylinders is permitted in rear of the floating piston valves during the recharging of the system to permit the piston valves to return to their normal operative position.

A further object of our invention is to provide a safety device for hydraulic brakes which can either be attached to a conventional master cylinder of a hydraulic brake system or cast as a part of the master cylinder and reservoir for new car installations, novel means being provided for taking care of the expansion of the fluid during the summer season.

A further object of our invention is the provision of novel means arranged in the reservoir of the system for effectively preventing the splashing of oil in the reservoir incident to the travel of the vehicle over a roadway, whereby the emulsifying of the oil will be prevented.

A further object of our invention is the provision of novel means for constructing the floating piston valves to facilitate sliding movement thereof in their cylinders without leakage of the fluid past the valves, and for closing a circuit through a signalling device when the same reach their extreme forward position, should loss of fluid occur in the line.

A further object of our invention is the provision of means for closing a circuit through the rear stop signal upon the operation of the master piston for applying the brakes.

A still further object of our invention is the provision of novel means for forming a lubricating bearing for the master cylinder piston rod, and for preventing the entrance of dust and road grit in the master cylinder.

With these and other objects in view, the invention consists in the novel construction, arrangement, and formation of parts, as will be hereinafter more specifically described, claimed, and illustrated in the accompanying drawings in which drawings:

Figure 1 is a fragmentary top plan view illustrating our improved safety device incorporated directly with the master cylinder and reservoir of a hydraulic brake;

Figure 2 is a detail vertical section taken substantially on the line 2—2 of Figure 1, looking in the direction of the arrows, illustrating the means employed for permitting the escape of fluid from the safety cylinders upon expansion of the fluid in the cylinders;

Figure 3 is a longitudinal section through one of the safety cylinders taken substantially on the line 3—3 of Figure 1, looking in the direction of the arrows;

Figure 4 is a vertical longitudinal section through the improved safety device incorporated with the master cylinder and reservoir of a hydraulic brake, the view being taken substantially on the line 4—4 of Figure 1;

Figure 5 is a horizontal sectional view taken substantially on the line 5—5 of Figure 4;

Figure 6 is a detail vertical sectional view through the single control valve;

Figure 7:
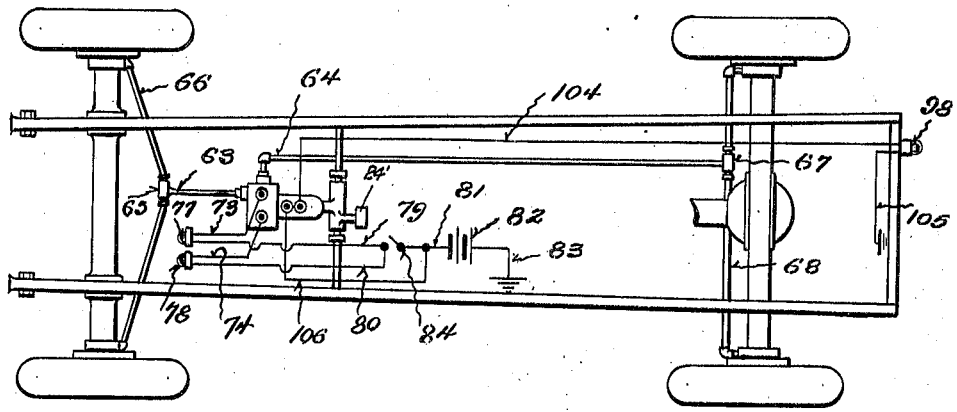
Figure 7 is a diagrammatic view showing a vehicle chassis in plan with our improved device incorporated therewith.

Referring to the drawings in detail, wherein similar reference characters designate corresponding parts throughout the several views, the letter A generally indicates our improved safety device. This safety device, as shown in Figures 1 to 5 inclusive, can be cast as a part of the master cylinder 10 and reservoir 11 of the hydraulic braking system. The reservoir 11 is preferably formed on top of the master cylinder 10, and can be provided with a removable cover 12. This cover is firmly held in place by the use of cap screws 13, and a gasket 14 can be interposed between the cover and the reservoir. In order to prevent the splashing of the fluid in the reservoir, we provide an anti-splash device 15. This anti-splash device 15 includes spaced horizontal plates 16 and spaced vertical plates 17. These plates extend, respectively, the length, width, and height of the reservoir, and can be provided with openings 18 to facilitate the draining of the fluid therethrough.

Reciprocally mounted within the master cylinder 10 is an operating piston 19. This piston 19 can include a metallic body portion 20 having outwardly extending stems 21 around which are fitted rubber gaskets or the like 22. Connected to the rearmost stem 21 of the piston is a coupling head 23 to which is attached the operating rod 24. This operating rod 24 is actuated through the use of any suitable mechanism from a foot pedal 24'. The rod 24 extends through a bearing 25 formed on a dome-shaped head plate 26. This head plate is firmly secured in place by the use of screws 27 to flanges on the reservoir and the cylinder. A leather or like diaphragm 28 is carried by the coupling 23 and has its edges clamped between the head 26 and the flanges of the reservoir and cylinder. This diaphragm effectively prevents the entrance of dust and dirt into the master cylinder and also creates an air suction.

An expansion coil spring 29 can be interposed between the cylinder 10 and the coupling 23, for normally urging the piston to the rear end of the cylinder. A packing gland 30 is carried by the bearing 25, and an oil cup 31 can be provided for lubricating the packing to facilitate the movement of the rod through the gland.

Our improved safety device A comprises a block 32 having a pair of like spaced parallel cylinders 33 and 34 formed therein. This block 32 is cast on the forward end of the cylinder 10 and the reservoir 11, and the cylinders 33 and 34 extend transversely of the master cylinder. The block 32 has formed therein a transversely extending passageway 35 disposed below the cylinders 33 and 34, and this passageway communicates with the forward end of the master cylinder 10. A longitudinally extending passageway 36 is formed in the block 32 between the cylinders 33 and 34, and one end of the longitudinal passageway 36 communicates with a transversely extending passageway 37 formed adjacent to the rear ends of the cylinders 33 and 34. Ports 38 and 39 connect the transversely extending passageway 37 with the rear ends of the cylinders 33 and 34.

The forward ends of the cylinders are open, and are normally closed by removable screw threaded heads 40 and 41. A vertically disposed tapered bore 42, constituting a valve seat, is formed in the block 32 between the cylinders and this vertical bore has communicating therewith the longitudinally extending passageway 36 and the diverging passageways 43 and 44, which lead into the forward ends of the cylinders 33 and 34.

By referring to Figure 4 of the drawings, it can be seen that the lower end of the tapered vertical bore 42 communicates with the main transversely extending passageway 35. Slidably mounted within the cylinders 33 and 34 are novel floating piston valves 45 and 46. These piston valves are constructed similar to the main operating piston 22, only on a smaller scale, and hence each of the piston valves include a metallic body 47 having oppositely extending stems 48 over which are sprung the novel rubber gaskets 49. These rubber gaskets are slightly oversize, so as to insure proper contact thereof with the cylinder walls.

It will be noted that the outer faces of the rubber gaskets are provided with annular grooves which facilitate the expansion and contraction of the gaskets. The outer faces of the metallic bodies 47 of the floating pistons are provided with annular grooves in which is fitted a special packing 50, for engagement with the cylinder walls. This construction of floating piston valves allows reciprocatory movement thereof, but efficiently prevents the leakage of fluid around the same.

Received within the tapered bore or valve seat 42 is the single control valve 51. This valve 51 is of the plug type, and includes an outwardly extending stem 52 to which can be secured a manipulating handle 53. Movement of the handle 53 is limited by a stop lug 54 cast on one of the cylinders. A nut 55 securely holds the valve 51 on its seat. This valve 51 is provided with a vertical bore 56 having communicating therewith diverging passageways 57 and 58, and a main passageway or port 59, which is adapted to normally align with the longitudinal passageway 36.

A diagonally extending bleed passageway 60 opens out through the top of the valve and through one side of the same substantially diametrically opposite the diverging passageways 57 and 58. The forward ends of the cylinders 33 and 34 have formed thereon bosses 61 and 62, and these bosses communicate respectively with the forward ends of the cylinders 33 and 34, and have connected therewith fluid conductor tubing 63 and 64, which lead respectively to the front and rear pairs of brakes.

By referring to Figure 7 it can be seen that the tubing 63 terminates in a T 65, to which is connected the branch pipes or tubes 66, which lead to the brakes for the front wheels. The tube 64 terminates in a T 67 which has communicating therewith pipes 68 which lead to the brakes for the rear wheels.

Extending through the heads 40 and 41 of the cylinders 33 and 34 are contact rods 69 and 70. These contact rods are insulated from the heads by means of non-conductor sleeves 71 which surround the rods. Binding nuts 72 are threaded on the rods to permit the connection of electrical conductors 73 and 74 therewith. The binding nuts 72 are insulated from the heads 40 and 41 by washers 75 formed from non-conducting material.

When the floating piston valves reach their extreme forward positions, the stems of the metallic bodies thereof will contact with the conductor rods 69 and 70. The device is grounded to the chassis of the vehicle in any desired way. The master cylinder 10 is rigidly secured to the frame of the vehicle in the ordinary manner, and, as shown, a bolt 76 is employed for that purpose, which extends through the flange on the master cylinder, and a part of the vehicle frame.

Again referring to Figure 7 of the drawings, it will be noted that we provide a pair of signalling lamps 77 and 78, which can be arranged at a convenient point on the vehicle, such as the instrument board. The lamp 77 can be provided for the front brakes and the lamp 78 can be provided for the rear brakes. Electrically connected with one contact of the lamp 77 is the conductor 73, and extending from the other contact of the lamp 77 is a conductor wire 79. Electrically connected with one contact of the lamp 78 is the conductor 74, and leading from the other contact of lamp 78 is a conductor 80. The conductor wires 79 and 80 can be connected together and electrically connected by means of a wire 81 to one terminal of a storage battery 82. The other terminal can be grounded, as at 83, to the frame of the vehicle. A manually operated switch 84 can be interposed in the length of the conductor 81 for rendering the lamps 77 and 78 inoperative, when desired.

In operation of our improved safety device, the valve 51 is normally positioned as shown in Figure 5 of the drawings. Hence, the diverging passageways 57 and 58 of the valve are out of alignment with the diverging passageways 43 and 44 formed in the block 32, but the passageway 59 aligns or registers with the longitudinal passageway 36. Thus, when the operator applies the brakes, and the rod 24 is pressed forwardly, the fluid will be forced through the passageway 35 by the piston 19, and the fluid will flow through the tapered bore 42, through the axial passageway 56, through the passageways 59, 36, and 37, through the ports 38 and 39, into the cylinders 33 and 34 in rear of the floating piston valves.

These valves will be forced forwardly, and the fluid in front of the same will be forced out of the bosses 61 and 62 to the braking cylinders of the wheels. Should a leak occur in the line, the fluid pressure in rear of the floating piston valves will move the valves to the extreme front of the cylinders, and the bodies of the valves will engage the conductor rods 69 and 70, and establish an electrical contact therewith. Loss of fluid in rear of the pistons will be prevented.

When electrical contact is established between the piston valves and the conductor rods 69 and 70, current will flow from the battery 82, through the conductor 81, through switch 84, through wires 79 and 80, through the lamps 77 and 78, through the piston valves to the block, thence to the ground, and back to the battery. The lamps will then be in operation and indicate to the driver that the brakes need attention. Obviously, the piston valves can operate independently of one another, so that should a leak occur, say in a front brake, only one piston valve will be moved forwardly to its extreme position for closing the circuit through its indicating lamp. The other piston valve will be operative, and hence permit operation of its brake.

After a leak has occurred, and the same has been repaired, it is necessary to recharge the system in advance of the piston valve, which has been actuated to its extreme position. This is easily accomplished through the manipulation of the single valve 51, and the same is turned so as to align the divergent passageways 57 and 58 thereof with the passageways 43 and 44, and to move the passageway 59 out of alignment with the longitudinal passageway 36.

When pressure is applied on the foot pedal to move the main operating piston forwardly, the fluid flows from the master cylinder, through the passageway 35, through the valve 51, and through the diverging passageways 57, 58, 43, and 44, into the forward ends of the cylinders 33 and 34, in advance of the floating pistons, and the pistons will be returned to their normal positions.

As the floating pistons return to their normal positions, the fluid in rear of the same will back up in the passageway 36, and this fluid is permitted to escape by means of the bleed passageway 60, which will be in alignment with the longitudinal extending passageway 36 formed in the block. Obviously, this loss of fluid will be slight and the passageway 36 can be recharged from the reservoir. As shown, the reservoir has communication with the master cylinder through ports 85 and 86. The port 86 is located in advance of the normal rearmost position of the main operating piston 19, while the port 85 is located intermediate the piston so as to form means for lubricating the same during the reciprocation thereof.

We prefer to provide means for indicating the height of the fluid in the reservoir, and hence a sight glass 86' can be provided. This sight glass can be set partially in a groove 87 formed in the front wall of the reservoir, and the lower end of the tube communicates with a passageway 88 and 89 formed in the block 32. This sight tube 86' can extend into a lip 90 formed on the cover 12, and can be secured in place by means of a vented plug 91 threaded into the lip.

The reservoir can be recharged by removing the screw 91, or by removing a plug 92' carried by the central portion of the cover. If preferred, the plug 92 can be entirely eliminated.

In the summer season it is highly important that means be provided for taking care of the expansion of the fluid in the cylinders 33 and 34. Thus the passageway 89 is extended transversely across the block 32 above the cylinders 33 and 34, and in rear of the valve 51. Ports 92 and 93 connect the passageway 89 with the cylinders 33 and 34, slightly in advance of the normal position of the piston valves 45 and 46. By this arrangement, when the fluid expands in the cylinders, the same can flow to the ports 92 and 93 into the passageway 89, and thence into the reservoir. Obviously, when the pistons move forwardly, the ports 92 and 93 are cut off. To prevent flow of fluid into the cylinders in front of the piston valves in the reservoirs, ball valves 94 and 95 are provided, and these valves normally close the ports 92 and 93. These valves are readily unseated when the oil expands in the cylinders. Screws 96 and 97 are provided for holding the ball valves on their seats during the recharging of the cylinders.

Means is also provided for operating a stop tail light signal lamp 98, by fluid pressure, upon the application of the brakes. By referring to Figures 5 and 7 of the drawings, it will be noted that this means can consist of a laterally extending cylinder 99 formed on the forward end of the master cylinder 10. A port 100 connects the laterally extending cylinder 99 with the master cylinder, and when the operating piston 19 moves forwardly, a certain quantity of the fluid under pressure will be forced into the lateral cylinder 99, through said port 100.

Slidably mounted within the lateral cylinder 99 is a piston 101, which is adapted to engage a contact post 102, when the piston 101 is moved forwardly. An expansion coil spring 103 is employed for normally holding the piston away from the contact. Secured to the post 102 by suitable nuts is a conductor wire 104, which is extended to one terminal of the stop signal light 98. The other terminal of the stop signal light is grounded, as at 105, to the frame.

Electrically connected with the piston 101 is a feed wire 106, which is connected to the wire 81 between the battery 82 and the control switch 84. Thus, the flow of current is as follows:

Through the post 102, through the wire 104, through lamp 98, wire 105, through the frame of the vehicle, through the battery, through wire 106, back to the piston.

By referring to Figures 1 to 5 inclusive, it will be noted that the block 32 is bored out to form the various passageways, and the outer ends of the bores are closed by suitable threaded stop plugs 107, or the like.

As heretofore intimated, the block 32 can be formed separate from the master cylinder, so that our improved safety device can be incorporated with braking systems now installed on vehicles in use.

Figure 8:
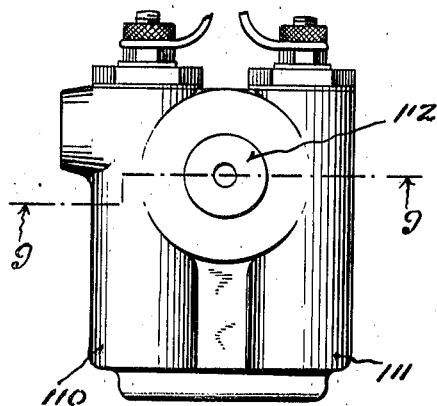
Figure 8 is a rear elevation showing my improved safety device made as an attachment for hydraulic braking systems already installed on motor vehicles in use, the device being shown removed from the master cylinder.
Figure 9:
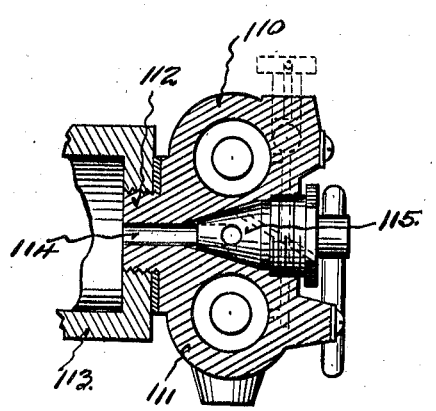
Figure 9 is a transverse section through the improved safety device, taken substantially on the line 9—9 of Figure 8, showing the same applied to a fragment of a master cylinder.

Reference can now be had to Figures 8 and 9, and it will be noted that we provide a pair of connected cylinders 110 and 111. Disposed between the cylinders and adjacent to one end thereof is a nipple 112, which is adapted to be threaded into one end of the usual master cylinder 113 of the braking cylinder. This nipple is provided with a bore 114 which communicates with the axial bore of a single control valve 115. This valve functions identically with the valve 51, and the entire device is constructed the same as the safety device previously described, the only difference being that communication is had with the master cylinder through the nipple 112 instead of the transverse bore 35, shown in Figure 4.

From the foregoing description it can be seen that we have provided an exceptionally simple and durable safety device for the hydraulic braking system of motor vehicles in which a single valve is employed for controlling the flow of fluid to the safety cylinders.

Changes in details may be made without departing from the spirit or the scope of our invention, but what we claim as new is:

1. In a fluid brake system for motor vehicles, a master cylinder, a safety device including a block having a pair of spaced parallel cylinders therein, a passageway in said block between the cylinders having communication with the master cylinder, a valve having an axial bore communicating at all times with the passageway, and means controlled by said valve for directing the flow of fluid simultaneously to one end of the parallel cylinders when in one position, and for simultaneously controlling the flow of fluid to the other end of the parallel cylinders when in another position.

2. In a fluid brake system for motor vehicles, a master cylinder, a safety device including a block having a pair of spaced parallel cylinders therein, a passageway in said block between the cylinders having communication with the master cylinder, a valve having an axial bore communicating at all times with the passageway, means controlled by said valve for directing the flow of fluid simultaneously to one end of the parallel cylinders when in one position, and for simultaneously controlling the flow of fluid to the other end of the parallel cylinders when in another position, and means for establishing a bleed with the parallel cylinders when the valve is in one of its positions.

3. In a fluid brake system for motor vehicles, a master cylinder, a safety device including a block having a pair of spaced parallel cylinders therein and a bore between said cylinders, a rotatable valve having an axial bore in communication with the first mentioned bore at all times, said first mentioned bore being in communication with the master cylinder passageways on one side of the first mentioned bore communicating with the parallel cylinders at one end, a passageway on the other side of the first mentioned bore communicating with the opposite ends of the parallel cylinders, floating piston valves in said parallel cylinders, means for connecting one end of one of the parallel cylinders with the front brakes of the cylinders, means for connecting one end of the other of said parallel cylinders with the rear brakes of the vehicle, said rotatable valve having ports for connection with the first mentioned passageway, when the valve is in one position for connecting said passageway with its bore and said valve having another port therein for connection with the other passageway of the block when the valve is in another position for connecting said last mentioned passageway with the bore of the valve.

4. In a fluid brake system for motor vehicles, a master cylinder, a safety device including a block having a pair of spaced parallel cylinders therein and a bore between said cylinders, a rotatable valve having an axial bore in communication with the first mentioned bore at all times, said first mentioned bore being in communication with the master cylinder passageways on one side of the first mentioned bore communicating with the parallel cylinders at one end, a passageway on the other side of the first mentioned bore communicating with the opposite ends of the parallel cylinders, floating piston valves in said parallel cylinders, means for connecting one end of one of the parallel cylinders with the front brakes of the cylinders, means for connecting one end of the other of said parallel cylinders with the rear brakes of the vehicle, said rotatable valve having ports for connection with the first mentioned passageway, when the valve is in one position for connecting said passageway with its bore and said valve having another port therein for connection with the other passageway of the block when the valve is in another position for connecting said last mentioned passageway with the bore of the valve, said valve having a bleeding passageway therein for connection with a certain passageway in the block when the valve is in one position.

5. In a fluid brake system for motor vehicles, a master cylinder, a reservoir carried by the cylinder and having communication therewith, a safety device including a block having a pair of spaced parallel cylinders therein, means for establishing communication between the master cylinder and the opposite ends of the parallel cylinders, floating piston valves in the parallel cylinders, one of the parallel cylinders having connection with the front brakes of the vehicle, and the other of said parallel cylinders having connection with the rear brakes of the vehicle, and means for taking care of expansion of fluid in advance of the floating pistons including a passageway in the block having communication with the reservoir, ports in the block communicating with the passageway, and with the cylinders slightly in advance of the normal position of the floating pistons, one-way opening valves for controlling the flow of fluid to the ports.

6. In a fluid brake system for motor vehicles, a master cylinder, a reservoir carried by the cylinder and having communication therewith, a safety device including a block having a pair of spaced parallel cylinders therein, means for establishing communication between the master cylinder and the opposite ends of the parallel cylinders, floating piston valves in the parallel cylinders, one of the parallel cylinders having connection with the front brakes of the vehicle, and the other of said parallel cylinders having connection with the rear brakes of the vehicle, and means for taking care of expansion of fluid in advance of the floating pistons including a passageway in the block having communication with the reservoir, ports in the block communicating with the passageway, and with the cylinders slightly in advance of the normal position of the floating pistons, one-way opening valves for controlling the flow of fluid to the ports, and manually operated means for holding the valves on their seats against movement when so desired.

EDWARD C. HESS.
EMIL HESS.